Dec. 17, 1957 J. E. CANDLIN, JR., ET AL 2,816,517
AXLE STEERING LOCK
Filed June 1, 1956 3 Sheets-Sheet 2

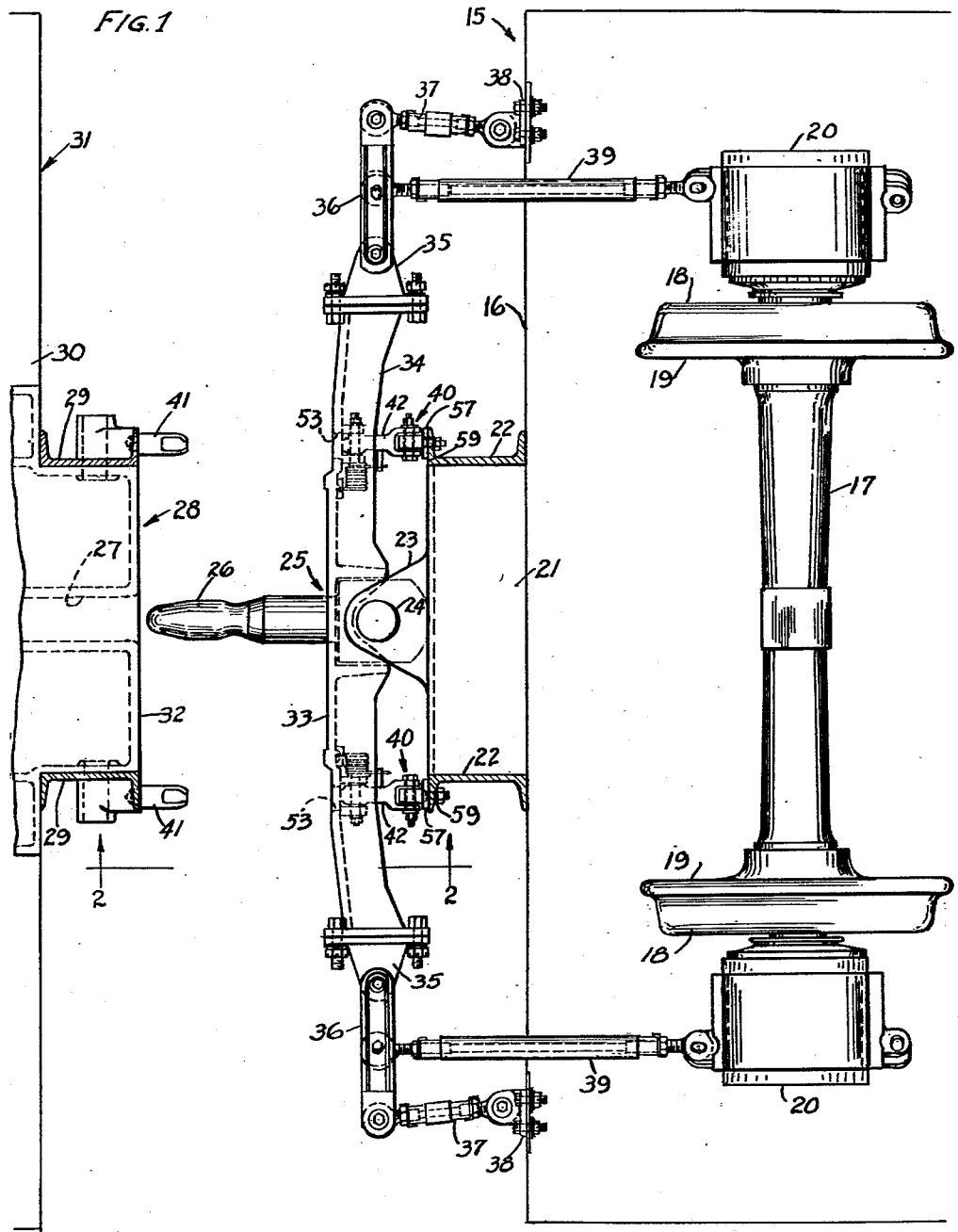

INVENTORS
JAMES E. CANDLIN JR. & WILLIAM VANDER SLUYS
Cromwell, Greist & Warden
ATTORNEYS Dec. 17, 1957  J. E. CANDLIN, JR., ET AL  2,816,517
AXLE STEERING LOCK
Filed June 1, 1956  3 Sheets-Sheet 3

INVENTORS
JAMES E. CANDLIN JR. & WILLIAM VANDER SLUYS
Cromwell, Greist & Warden
ATTORNEYS

United States Patent Office 2,816,517
Patented Dec. 17, 1957

2,816,517

AXLE STEERING LOCK

James E. Candlin, Jr., Lansing, and William Van Der Sluys, Homewood, Ill., assignors to Pullman-Standard Car Manufacturing Company, Chicago, Ill., a corporation of Delaware Application June 1, 1956, Serial No. 588,824

16 Claims. (Cl. 105—4)

The present invention relates generally to an automatic locking arrangement for use with an axle steering mechanism to maintain the axle in squared-off relation with the vehicle mounted relative to the same when the vehicle is in uncoupled condition. More specifically, the present invention is directed to a locking arrangement adapted for automatically asserting itself to maintain a wheel-carrying axle interconnected and controlled by an axle steering mechanism in squared-off relation with respect to a vehicle mounted relative to the same when the vehicle is in uncoupled condition, the end of an adjacent vehicle being provided with means for automatically unlocking the axle steering mechanism when the opposed ends of the vehicles are interconnected in coupled relation.

With the advent of lightweight, high speed single axle railway cars, it has been found preferable to utilize an axle steering mechanism to positively steer each axle and associated wheels into and out of a curve. Among the forms of axle steering mechanisms found suitable is the type which is connected between a pivotally mounted coupling member and the axle of the car. The coupling member is preferably a male coupler adapted for mating engagement with a female coupling member carried by an adjacent end of another single axle railway car. In cars of this design, the single axle of each car is located near the end of the car which carries the male coupling member thereby providing a wheel-supported end and the remaining end of each car is provided with a female coupling member, this latter end being coupler-supported by the male or wheel-supported end of an adjacent car. The male coupling member is pivotally mounted on the wheel-supported end and, upon mating with a female coupling member of an adjacent car, follows the movement of the adjacent car relative to its own car. This relative movement between the male coupling member and the car carrying the same is transmitted through a suitable axle steering mechanism to the axle of the latter car to positively steer the axle into and out of curves during the operation of a train formed from a plurality of such cars.

Railway cars of the type described are standardized in production, each being provided with a male and female end, the male end being wheel-supported and the female end coupler-supported. In the forming of a train consist from a plurality of such cars, the rearmost car is arranged so that its wheel-supported end follows its coupler-supported end and, as a result, the single axle of the rearmost car is not positively steered by an adjacent interconnected car. Without positive steering action applied to the rearmost single axle there is a tendency for this axle to shimmy during high speed operation and, consequently, it has been considered desirable to provide the axle steering mechanism with locking means to generally hold the axle in a substantially squared-off relation with the car body associated therewith. Still further, when cars of this type are uncoupled and moved about in an uncoupled condition, the provision of axle steering lock means reduces the possibility of the axle moving relative to the car body into an undesirable position. Operation of the locking means maintains the axle in a substantially squared-off relation with the car body thereby allowing the uncoupled car to be more easily moved in its uncoupled condition.

In addition to the foregoing a further advantage resides in the use of an axle steering lock arrangement where automatic coupling between cars is utilized. With the use of male and female coupling members it is possible to arrange the same to allow automatic coupling upon the movement of one car toward another. The axle steering lock arrangement may be utilized in such a manner as to act to center the male coupling member and thereby enhance automatic coupling when the same is brought about on a straight section of track.

It is an object of the present invention to provide a new and improved locking arrangement adapted for fixing a pivotally mounted member forming a part of an axle steering mechanism relative to the vehicle carrying the same when the vehicle is in an uncoupled condition to maintain an axle of the vehicle in squared-off relation thereto.

Another object is to provide a coupler locking arrangement which includes locking means which are automatically placed into locking position when adjacent ends of vehicles are uncoupled, the locking means being further automatically moved out of locking position when adjacent ends of vehicles are brought into coupled relation.

Still another object is to provide a locking arrangement adapted for use with a pivotally mounted coupling member having associated therewith an axle steering mechanism controlling the steering of a wheel-carrying axle in response to movement of the coupler relative to the vehicle carrying the same, which locking arrangement is adapted for automatically locking the coupling member and axle in squared-off relation with respect to the vehicle associated with the same when the vehicle is uncoupled and automatically releasing the coupling member and axle when the vehicle is coupled.

A further object is to provide a locking arrangement of uncomplicated design and low cost maintenance particularly adapted for use with a pivotally mounted male coupling member having associated therewith a utility-carrying face plate interconnected at its ends with an axle steering mechanism operatively associated with a wheel-carrying axle, the male coupling member being adapted for coupled interconnection with a female coupling member carried by an end of an adjacent railway car, which female coupling member is provided with means for automatically releasing the locking arrangement when the coupling members are interconnected, the locking and unlocking of the male coupling member being brought about automatically in response to disengagement or engagement between the coupling members.

Other objects not specifically set forth will become apparent from the following detailed description made in conjunction with the drawings wherein:

Fig. 1 is a fragmentary top plan view of adjacent male and female ends of railway cars having associated therewith the locking arrangement of the present invention, portions of the car bodies being shown schematically to better illustrate the coupling and axle steering elements affected by the operation of the locking arrangement;

3

Figures 4, 5, 6:
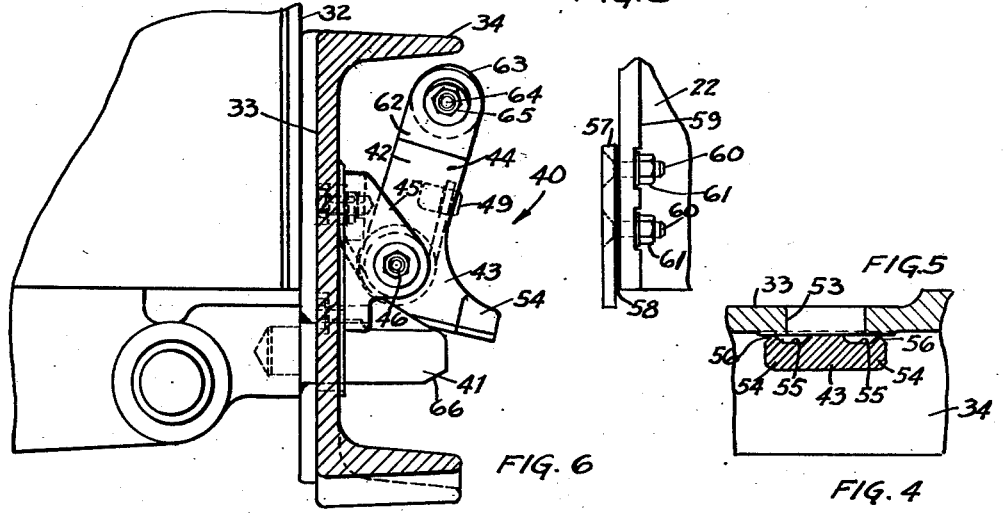
Fig. 4 is a partly sectioned end elevation taken generally along line 4—4 of Fig. 2.
Figure 2:
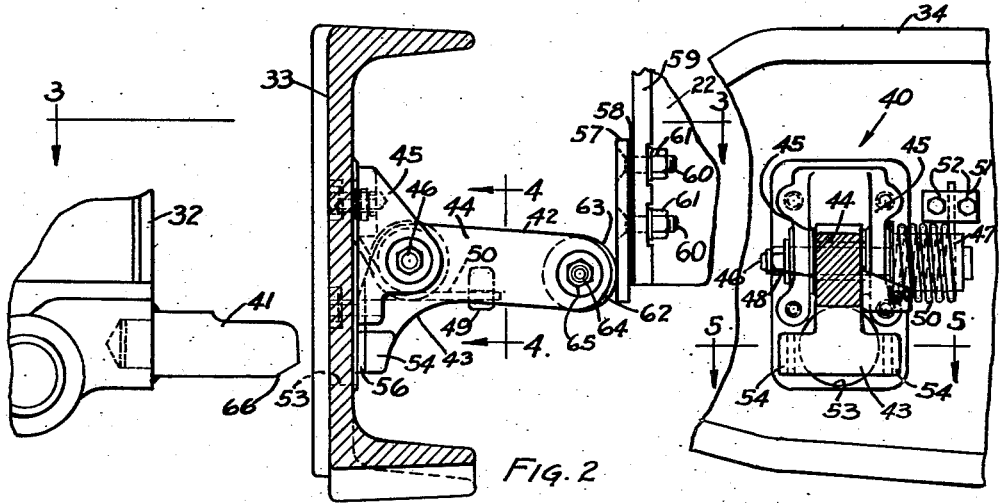
Fig. 2 is an enlarged fragmentary partly sectioned side elevation of the elements of the locking arrangement being taken generally along line 2—2 of Fig. 1.
Figure 8:
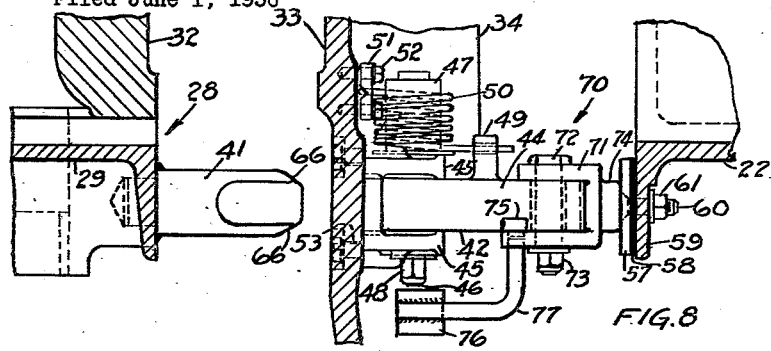
Figures 9, 10:
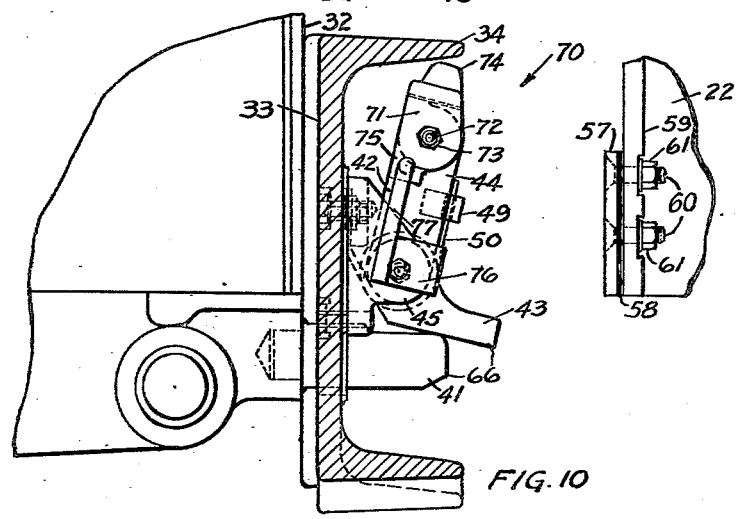
Figure 7:
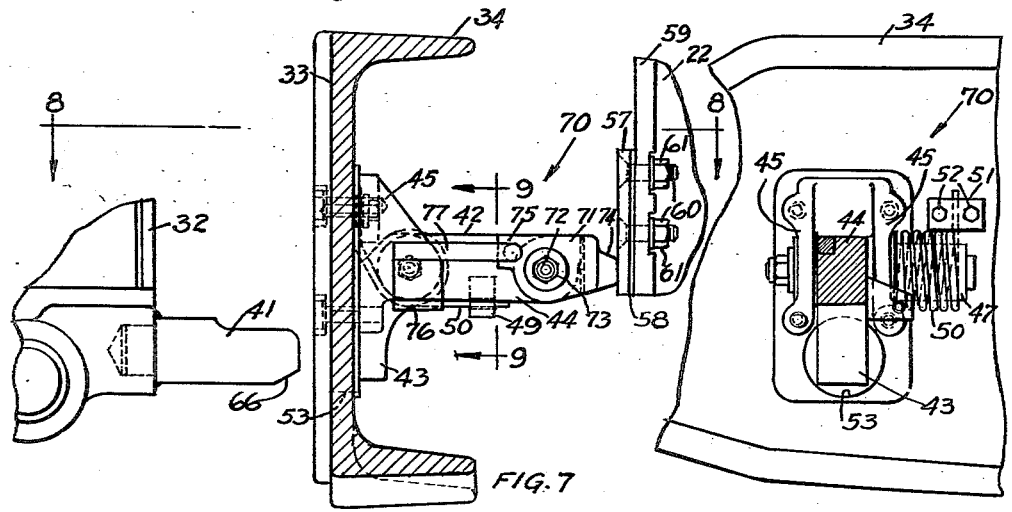

Fig. 5 is a partial section taken generally along line 5—5 of Fig. 4;

Fig. 6 is a fragmentary side elevation similar to Fig. 2 illustrating the unlocked position of the elements of the locking arrangement;

Fig. 7 is a side elevation similar to Fig. 2 and illustrating the locking arrangement of Fig. 2 utilizing a modified element therein;

Fig. 8 is a top plan view taken generally along line 8—8 of Fig. 7;

Fig. 9 is an end elevation in partial section taken generally along line 9—9 of Fig. 7; and Fig. 10 is a fragmentary side elevation similar to Fig. 7 illustrating the positioning of the elements of the modified locking arrangement in unlocked condition.

In Fig. 1 the male end of a single axle lightweight, high speed railway car 15 of the type previously described is shown as including a car body 16 supported by an axle 17 carrying laterally spaced wheels 18 provided with wheel flanges 19 of conventional design. The axle 17 carries at the ends thereof outwardly of the wheels 18 journal boxes 20 to which the suspension system supporting the car body 16 is connected. The end of the car body 16 is provided with an end sill 21 defined along the sides thereof by spaced vertically extending collision posts 22. The end face of the end sill 21 carries a flange 23 to which is pivotally mounted by a pin 24 a male coupling member generally designated by the numeral 25.

The male coupling member 25 is provided with a coupling pin 26 which tapers inwardly in an outwardly direction near the end thereof to provide self-centering action with respect to a recess 27 carried by a female coupling member, generally designated by the numeral 28, mounted between collision posts 29 attached to the end of a car body 30 of an adjacent railway car 31. The end of the car 31 illustrated in Fig. 1 is the female end of the type of single axle lightweight, high speed railway car described above and the male coupling member 25 and female coupling member 28 are designed to provide automatic coupling between the adjacent ends of the cars 15 and 31 when one of the cars is moved toward the other.

The female coupling member 28 is fixed with respect to the car body 30 while the male coupling member 25, being pivotally mounted with respect to the car body 16, is designed to move relative to the car 15 when the cars 15 and 31 are coupled by the receiving of the male coupling pin 26 within the female coupling recess 27. The female coupling member 28 is provided with a coupling face 32 adapted to carry utility connections (not shown) and which abuts the foremost surface of a male coupler face plate 33 which is also adapted to carry utility connections to promote interconnection of utility lines between the cars 15 and 31 when the same are in coupled relation. The face plate 33 of the male coupler 25 is a part of a transverse or laterally extending beam 34 which, as shown in Fig. 2, is a channel beam of cup-like shape. The beam 34 is fixed to the pin 26 and moves therewith relative to the car body 16 when the cars 15 and 31 are operatively coupled.

The opposite outermost ends of the beams 34 have attached thereto brackets 35 which interconnect elements of an axle steering mechanism with the male coupling member 25. The axle steering mechanism is formed from identical side units operatively carried on each side of the male coupling member 25 and in describing these units like reference numerals designate similar parts. Each of the brackets 35 has pivotally attached thereto steering levers 36 which extend outwardly therefrom and which at their outermost ends are pivotally attached to rearwardly directed steering links 37 which in turn are pivotally connected to the end of the car body 16 by brackets 38. Intermediate the ends of the steering levers 36 are pivotally connected steering rods 39 which extend rearwardly toward the axle 17 and have their remaining ends pivotally attached to the journal boxes 20. The axle steering mechanism illustrated is the same as that described in detail in our copending application Serial No. 571,863, filed March 16, 1956. Upon coupling the cars 15 and 31, the male coupling member 25 will follow the car 31 and move therewith relative to the car 15 by reason of its pivotal connection to the latter. The beam 34 will, therefore, operate the various elements of the axle steering mechanism to transmit relative movement between the cars 15 and 31 to the axle 17 to steer the same. An axle steering mechanism of the type illustrated is particularly adapted for use in steering the axle of a railway car into a curve when the car negotiates the same. By positively steering the axle the wheel flanges 19 do not tend to climb the rails and the riding comfort and safety of the passengers is enhanced.

When the cars 15 and 31 are disconnected as shown in Fig. 1, it is desirable to provide means to retain the axle 17 in squared-off relation with the car body 16 as previously described. The maintaining of the male coupling member 25 in squared-off position is also advantageous during automatic coupling of the cars 15 and 31. By maintaining the pin 26 in a centered position the pin will properly contact the coupling recess 27 of the female coupling member 28 and automatic coupling between the cars 15 and 31 will occur without the necessity of relying upon manual adjustment or implementation. By restraining the male coupling member 25 against movement relative to the car body 16, the transverse beam 34 will be maintained in substantially parallel relation with the end surface of the car body 16 and the axle 17, through its interconnecting axle steering mechanism, will be secured in squared-off relation with the car body 16.

To provide for the fixing of the male coupling member 25 and axle 17 with respect to the car body 16 when the car 15 is uncoupled, a locking arrangement is provided which includes the use of locking levers or fingers 40 spring mounted on the inner face of the face plate 33 forming a part of the transverse beam 34 and in bridging positioning between the beam 34 and the outer end flanges of the collision posts 22. As shown in Fig. 1, a locking finger 40 is positioned on each side of the male coupling member pivot point, as defined by the pin 24, so as to provide bracing against pivotal movement of the male coupling member 25 in a clockwise or counterclockwise direction about its pivot point. As will subsequently be described in greater detail, the locking fingers 40 are each designed to automatically move into locking position when the cars 15 and 31 are uncoupled. The collision posts 29 of the end sill carrying the female coupling member 28 of the car 31 are provided with spaced pins 41 which, when the cars 15 and 31 are brought into coupled relation, cooperate with the locking fingers 40 to cam the same into an unlocked position thereby freeing the male coupling member 25 to allow the same to move with the car 31 relative to the car 15.

Figure 3:
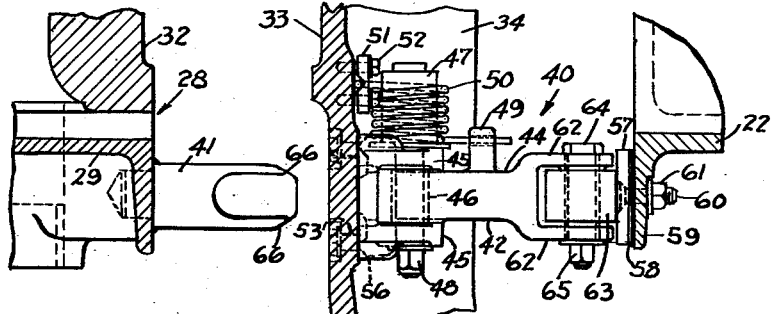
Fig. 3 is a fragmentary plan view partly sectioned and taken generally along line 3—3 of Fig. 2.

To describe the details of the elements of the locking arrangement, reference is now made to Figs. 3–5 wherein a cooperating locking finger 40 and pin 41 are illustrated, it being understood that each of the locking fingers 40 and pins 41 are of the same design. The locking finger 40 is formed from an L-shaped member 42 which defines a foot portion 43 integral with a leg portion 44. The L-shaped locking member 42 is pivotally mounted between spaced ears of a bracket 45 suitably secured to the inner surface of the face plate 33 by a pin 46 extending therethrough and held at one end by an enlarged head portion 47 and at the other end by a nut 48. The leg 44 carries a spring end retaining bracket 49 which retains an end of a coiled spring 50 mounted on the enlarged head portion 47 and held at its remaining free end against the inner surface of the face plate 33 by a plate 51 attached to the face plate 33 by bolts 52. The spring 50 is so positioned and so interconnected with the L-shaped member 42 that it constantly biases the locking finger 40 into locking position as shown in Figs. 2–5. In this position the foot 43 is in abutment with the inner surface of the face plate 33 and substantially covers an aperture 53 extending therethrough.

As particularly shown in Figs. 4 and 5, the foot portion 43 is provided with oppositely directed transverse flanged portions 54 which are provided with grooves 55 on their inner surfaces in opposed relation with the inner surface of the face plate 33. The margins of the grooves 55 are defined by outwardly directed V-shaped ridges 56 which contact the inner surface of the face plate 33 inwardly of the edge of the aperture 53 in the form of knife-like edges. The purpose of these knife-like ridges 56 is to prevent the accumulation of ice or caked mud or dirt about the aperture 53 to an extent that the foot portion 43 is incapable of moving into intimate contact with the inner surface of the face plate 33 when the locking finger 40 moves into locking position. In other words, in order to obtain proper locking action it is necessary that the foot portion 43 move toward the inner surface of the face plate 33 under the action of the spring 50 to an extent that the leg portion 44 moves out into substantially right angled relation with the transverse beam 34. When the spring 50 moves the locking finger 40 into its locked position the biasing strength of the same is sufficient to move the foot portion 43 against the inner surface of the face plate 33 surrounding the aperture 53 with sufficient force to cause the knife-like ridges 56 to strike accumulated foreign matter and cause the same to disintegrate or break up to an extent that this portion of the inner surface of the face plate 33 is maintained substantially clean and free of accumulated foreign matter and the locking finger 40 is allowed to move into its fully engaged locking position.

Each of the collision posts 22 of the end sill 21 carries a wear plate 57 and gaskets 58 held against the outer surface of the foremost flange 59 by spaced bolts 60 and cooperating nuts 61. The free end of the leg portion 44 of the locking finger 40 is provided with an integral clevis defining spaced ears 62 which receive therebetween a roller 63 rotatably held between the ears 62 by a bolt 64 and nut 65. As shown in Fig. 2, the roller 63 is positioned to extend slightly beyond the end surface of the ears 62 so as to contact the outer surface of the wear plate 57 when the locking finger 40 is moved into locking position between the transverse beam 34 and the collision post 22.

The provision of the roller 63 aids the biasing action of the spring 50 in moving the locking finger 40 into locking relation by reducing friction between the wear plate 57 and the free end of the leg portion 44 upon contact therebetween. As shown in Fig. 2, the pivot point defined by the pin 46 is spaced from the inner surface of the face plate 33 to allow the free end of the leg portion 44 carrying the roller 63 to move past dead center relation with the pin 46 to assure complete locking abutment with the wear plate 57 and prevent movement of the locking finger 40 against the biasing action of its spring 50 toward unlocked position upon a tendency of the transverse beam 34 to move toward the wear plate 57. The past center movement of the roller 63 establishes a locking condition which may not be overcome except by the application of a positive force to the locking finger 40 causing the same to move in a counterclockwise direction around its pivot point defined by the pin 46 and against the biasing action of the spring 50. Such a force must include components directed in a plane substantially parallel to the transverse vertical axis of the beam 34 and forces of this nature would not normally be encountered during operation of the car 15.

In order to move the locking fingers 40 from their locked position it is necessary to substantially complete the coupling of the cars 15 and 31 at which point the pins 41 enter the spaced apertures 53 carried in the face plate 33 of the transverse beam 34. The pins 41 are tapered inwardly at their ends as shown by the bevels 66 and this tapering aids in proper centering between the pins 41 and the edges of the apertures 53. As the pins 41 enter the apertures 53 their end surfaces contact the front surfaces of the foot portions 43 and continued movement of the pins through the apertures 53 into the interior of the transverse beam 34 cams the locking fingers 40 about their pivot points defined by the pins 46 and causes the leg portions 44 to move upwardly out of engagement with the wear plates 57 as shown in Fig. 6. Upon complete upward movement of the leg portions 44 the pins 41 are fully received within the apertures 53 and the outer surfaces of the face plates 32 and 33 are in abutment and utility connections between the cars 15 and 31 may be completed. At the time that the locking fingers 40 are moved out of locking relation with the wear plates 57, the automatic coupling operation between the cars 15 and 31 is at least substantially completed and the interconnected cars are ready for use.

The pin 41 acts as a cam against the outer surface of the foot portion 43 and forces the leg portion 44 upwardly into a substantially parallel relation with the face plate 33. To facilitate the movement of the free end of the leg portion 44 across the wear plate 57 as the locking finger moves out of locked position, the roller 63 functions to reduce frictional drag and allows the locking finger 40 to move easily into unlocked position in response to the camming force supplied by the pin 41. The spring 50 is placed under increased compression and upon the uncoupling of the cars 15 and 31 and withdrawal of the pin 41 through the aperture 53 the spring 50 will bias the locking finger 40 back into its locked position. It will be noted that the pins 41 are considerably shorter than the male coupling pin 26 and that, upon the uncoupling of the cars 15 and 31, the locking fingers 40 will move into locked position prior to complete removal of the pin 26 from the female coupling member recess 27. This arrangement insures proper locking as the female coupling member 28 will retain the male coupling member 25 in a squared-off position relative to the car body 16 until the locking fingers 40 are completely seated in locked position.

In Figs. 7–10 a modified form of locking finger 70 is illustrated. With respect to elements cooperating with the modified locking finger 70 and portions thereof which are of the same design as described in connection with the locking fingers 40, like reference numerals are used. It will be noted in comparing the locking fingers 70 with the locking finger 40, the main difference in design resides in the elements carried by the free end of the leg portion 44. The free end of this portion receives thereabout a clevis or knuckle 71 pivotally attached thereto by a bolt 72 held in place by a nut 73 and being provided with a nub or protrusion 74 which contacts the wear plate 57. One of the ears of the knuckle 71 extends substantially inwardly beyond the pin 72 and is provided with a radially inwardly extending shoulder 75 which seats within a recess receiving the same in the top surface of the leg portion 44. A counterweight 76 is attached by an angle iron 77 to this portion of the knuckle 71 and the weight of the counterweight 76 is sufficient to retain the shoulder 75 seated in the groove carried by the leg portion 44 of the locking finger 70.

Under these circumstances the projection 74 will normally be positioned so as to extend directly outwardly beyond the end of the leg portion 44 and into engagement with the outer surface of the wear plate 57. The biasing strength of the spring 50 is adequate to force the projection 74 downwardly across the outer surface of the wear plate 57 to wedge the leg portion 44 of the locking finger 70 into locked position between the transverse beam 34 and the wear plate 57. Upon subjecting the foot portion 43 to the camming action of pin 41, the leg portion 44 will move upwardly to a position shown in Fig. 10 as previously described in connection with the locking finger 40. In the event that a force acting on the transverse beam 34 is adequate to wedge the leg portion 44 of the locking finger 70 into tight frictional engagement with the wear plate 57 to an extent that there is a possibility of damage resulting from the forcing of the locknig finger 70 into its unlocked position by the pin 41, the damaging load wedging the locking finger 70 will be released by pivotal movement of the knuckle 71 about its pin 72 in a clockwise direction and in opposition to the weight of the counterweight 76. As a result, the knuckle and its integral projection 74 will jackknife relative to the free end of the leg portion 44 and against the weight of the counterweight 76 to allow the pin 41 to readily move the locking finger 70 about its pivot point defined by the pin 46 without damage being done to the wear plate 57 or any other associated elements. Once the jackknifing of the knuckle 71 has been completed, the load on the locking finger 70 is reduced and upon clearance of the projection 74 from the wear plate 57 the counterweight 76 will again reassert itself to return the knuckle 71 to its original position by causing the same to pivot about the pin 72 in a counter-clockwise direction.

With the provision of the rollers 63, the locking mechanism is capable of efficient operation under all conditions of use. If the interconnected cars 15 and 31 should be uncoupled while being situated on a curve in the track, the beam 34 being held in a turned position relative to the car 15 by the axle steering mechanism, one of the locking elements will be unable to move into its complete locking position due to the angular positioning of the beam 34 relative to the car 15. However, upon subsequent movement of the uncoupled car 15 onto a substantially straight portion of the track, the axle 17 will be cammed by the action of the rails on the wheels 18 into a substantially squared-off relation with the car body 16 and the axle steering mechanism will move the beam 34 sufficient to allow the unseated locking finger to move into locked position. The functioning of the rollers 63 in reducing friction allows the locking fingers to move easily into locked position thereby moving the beam 34 and axle 17 into squared-off positions.

During the automatic coupling of the cars 15 and 31, the axle 17 may not be completely squared-off relative to the car body 16 due to the positioning of the car 15 on a slight curve in the track. Under such circumstances the rails may cam the axle 17 against the resiliency of the suspension system interconnecting the same with the car body 16 and thereby force one of the locking fingers tightly against its associated wear plate 57. Friction of considerable magnitude is developed between the wedged locking finger and its associated wear plate and the unlocking force provided by a pin 41 brought into contact therewith must be of considerable magnitude to overcome the added frictional forces. The provision of a roller 63 or knuckle 71 allows the wedged finger to be readily moved out of locking position as these particular elements eliminate the possibility of the development of frictional forces of a magnitude greater than the unlocking force asserted by the pin 41. The counterweights 76 function to hold the knuckles 71 in locking position while allowing the same to jackknife during the unlocking operation to counterbalance added frictional forces resulting from misalignment of the axle 17. While counterweights 76 are preferably used, it should be apparent that, due to the arrangement of the knuckles 71, counterweights are not necessary in promoting efficient operation during locking or unlocking action of the fingers 70. The knuckles 71, being designed to provide "broken-back" action, are adequate alone to overcome frictional forces developed during the use of the locking arrangement.

While the locking fingers 40 and 70 have been described in connection with the use of springs 50 to bias the same into locked position, it should be understood that any other suitable means, such as rubber bushings, may be utilized. Still further, while the use of resilient means is preferred, the locking fingers 40 and 70 may be gravity operated if desired. While the use of the locking fingers 40 and 70 has been described in connection with a male coupling member, it should be understood that the use of a pivotally mounted transverse member connected to the axle steering mechanism may be locked in the same manner, this single member being provided with means for attaching the same to an adjacent car to transmit relative movement between the interconnected cars through the axle steering mechanism to the axle to be steered. A transverse member of this nature may be in the form of a utility plate carried by the car body in any desired location.

From the foregoing description of the different forms of locking fingers and their operation in the locking arrangement of the present invention, it should be apparent that the locking arrangement is uncomplicated in design while highly efficient in operation. The arrangement lends itself to all-weather operation and requires little maintenance over a long period of time. The elements of the locking arrangement are relatively small and the weight added to the over-all weight of the railway cars is negligible.

Obviously many modifications and variations of the invention as hereinbefore set forth may be made without departing from the spirit and scope thereof, and therefore only such limitations should be imposed as are indicated in the appended claims.

We claim:

1. A locking arrangement for use with a vehicle having a pivotally mounted transverse member adapted for at least substantially horizontal movement for operating an axle steering mechanism, said arrangement including locking means pivotally carried between said transverse member and vehicle for bridging the distance between a portion of the transverse member spaced from its pivotal mounting and the vehicle, said locking means being movable into and out of bridging positioning for fixing and releasing said transverse member to prevent and allow movement relative to said vehicle.

2. A locking arrangement for use with a pivotally mounted vehicle coupler adapted for at least substantially horizontal movement and operating an axle steering mechanism, said arrangement including locking means pivotally carried by said coupler for bridging the distance between a transverse portion of the coupler spaced from its pivotal mounting and a portion fixed to the body of the vehicle to hold said coupler against movement relative thereto, said locking means being movable into and out of bridging positioning for fixing and releasing said coupler with respect to said vehicle.

3. A locking arrangement for use with a pivotally mounted vehicle coupler adapted for at least substantially horizontal movement and operating an axle steering mechanism, said arrangement including locking means pivotally carried by said coupler for bridging the distance between a portion of the coupler spaced from its pivotal mounting and the vehicle, said locking means being movable into and out of bridging positioning for fixing and releasing said coupler to prevent and allow movement relative to said vehicle, said locking means being spring urged into bridging positioning, and camming means carried by an adjacent vehicle associated with said locking means for holding the same out of bridging positioning when said coupler interconnects said first named vehicle with said adjacent vehicle.

4. A locking arrangement for use with a transverse member pivotally mounted on a vehicle for horizontal movement relative thereto and adapted for operating an axle steering mechanism, said arrangement including locking means carried by said transverse member for bridging the distance between a portion of the transverse member spaced from its pivotal mounting and the vehicle, said locking means being movable into and out of bridging positioning for fixing and releasing said transverse member to prevent and allow movement relative to said vehicle, and camming means carried by an adjacent vehicle associated with said locking means for holding the same out of bridging positioning when said first named vehicle is interconnected with said adjacent vehicle, said locking means being formed from an L-shaped element defining foot and leg portions pivotally mounted for movement of said leg portion into substantially rearwardly directed relation with said transverse member, said foot portion being adapted for camming operation by a pin constituting said camming means moved into contact therewith to move said leg portion into unlocked position, the free end of said leg portion carrying an independently movable member for engagement with the vehicle carrying said transverse member.

5. A locking arrangement for use with a pivotally mounted vehicle coupler adapted for at least substantially horizontal movement and operating an axle steering mechanism, said arrangement including locking means carried by said coupler for bridging the distance between a portion of the coupler spaced from its pivotal mounting and the vehicle, said locking means being movable into and out of bridging positioning for fixing and releasing said coupler to prevent and allow movement relative to said vehicle, said locking means being spring urged into bridging positioning, and camming means carried by an adjacent vehicle associated with said locking means for holding the same out of bridging positioning when said coupler interconnects said first named vehicle with said adjacent vehicle, said locking means being formed from an L-shaped element defining foot and leg portions pivotally mounted for movement of said leg portion into substantially rearwardly directed relation with said coupler, said foot portion being adapted for camming operation by a pin constituting said camming means moved into contact therewith to move said leg portion into unlocked position, the free end of said leg portion carrying a rotatable knuckle for engagement with the vehicle carrying said coupler, said rotatable knuckle being adapted to jackknife relative to said leg portion when said locking member is moved out of locking position under load.

6. An axle steering mechanism locking arrangement having portions mounted on adjacent ends of interconnected vehicles, one of said portions including spaced locking fingers pivotally carried by a transverse member to which an axle steering mechanism is connected and which is movable relative to the vehicle carrying the same in a horizontal plane, and spaced pins constituting the other of said portions and carried by the adjacent end of a vehicle interconnected with said first named vehicle, said pins camming said locking fingers into inoperative relation with said transverse member, said pins adapted for movement out of camming relation with said locking fingers upon disconnection of said vehicles at which point said locking fingers are movable into abutting relation with the vehicle carrying said transverse member to restrain operation of said axle steering mechanism.

7. The locking arrangement of claim 6 wherein said locking fingers each are formed from an L-shaped element defining foot and leg portions pivotally mounted for movement of said leg portion into substantially rearwardly directed relation with said transverse member, said foot portion being adapted for camming operation by a pin moved into contact therewith to move said leg portion into unlocked position, said transverse member being provided with a pin-receiving aperture which is at least partially covered by said foot portion in locking position, the free end of said leg portion carrying a friction reducing rotatable member for engagement with the vehicle carrying said transverse member.

8. The locking arrangement of claim 7 wherein said foot portion is provided with V-shaped contact ridges for engagement with the surface surrounding said pin-receiving aperture.

9. The locking arrangement of claim 7 wherein said rotatable member is adapted to jackknife relative to said leg portion when said locking member is moved out of locking position under load.

10. In railway cars having adjacent ends adapted for interconnection by coupling members, one of said ends being provided with a laterally extending portion associated with a coupling member which is pivotally movable in a horizontal plane relative to said end, the other of said ends being provided with a cooperating coupling member, the provision of spaced locking fingers pivotally carried by said laterally extending portion and being resiliently biased for movement into bridging abutting relation between said laterally extending portion and an element forming a part of said first end to restrain pivotal movement of said first coupling member relative to said first end when said cars are unconnected, and spaced lock-releasing pins carried by the coupling member of said other end for camming cooperation with said fingers to move the same out of bridging abutting relation when said ends are interconnected.

11. In railway cars having adjacent ends adapted for interconnection by coupling members, one of said ends being provided with a laterally extending portion associated with a coupling member which is pivotally movable in a horizontal plane relative to said end, the other of said ends being provided with a cooperating coupling member, the provision of spaced locking fingers carried by said laterally extending portion and being resiliently biased for movement into bridging abutting relation between said laterally extending portion and an element forming a part of said first end to restrain pivotal movement of said first coupling member relative to said first end when said cars are unconnected, and spaced lock-releasing pins carried by the coupling member of said other end for cooperation with said fingers to move the same out of bridging abutting relation when said ends are interconnected, said locking fingers each being formed from an L-shaped element defining foot and leg portions pivotally mounted for movement of said leg portion into substantially rearwardly directed relation with said laterally extending portion, said foot portion being adapted for camming operation by one of said pins moved into contact therewith to move said leg portion into unlocked position, said laterally extending portion being provided with a pin-receiving aperture which is at least partially covered by said foot portion in locking position.

12. In railway cars having adjacent ends adapted for interconnection by coupling members, one of said ends being provided with a laterally extending portion associated with a coupling member which is pivotally movable in a horizontal plane relative to said end, the other of said ends being provided with a cooperating coupling member, the provision of spaced locking fingers carried by said laterally extending portion and being resiliently biased for movement into bridging abutting relation between said laterally extending portion and an element forming a part of said first end to restrain pivotal movement of said first coupling member relative to said first end when said cars are unconnected, and spaced lock-releasing pins carried by the coupling member of said other end for cooperation with said fingers to move the same out of bridging abutting relation when said ends are interconnected, said locking fingers each being formed from an L-shaped element defining foot and leg portions pivotally mounted for movement of said leg portion into substantially right angled relation with said laterally extending portion, said foot portion being adapted for camming operation by one of said pins moved into contact therewith to move said leg portion into unlocked position, said laterally extending portion being provided with a pin-receiving aperture which is at least partially covered by said foot portion in locking position, the free end of said leg portion carrying a friction reducing rotatable member for engagement with said element forming a part of said first end.

13. In railway cars having adjacent ends adapted for interconnection by coupling members, one of said ends being provided with a laterally extending portion associated with a coupling member which is pivotally movable in a horizontal plane relative to said end, the other of said ends being provided with a cooperating coupling member, the provision of spaced locking fingers carried by said laterally extending portion and being resiliently biased for movement into bridging abutting relation between said laterally extending portion and an element forming a part of said first end to restrain pivotal movement of said first coupling member relative to said first end when said cars are unconnected, and spaced lock-releasing pins carried by the coupling member of said other end for cooperation with said fingers to move the same out of bridging abutting relation when said ends are interconnected, said locking fingers each being formed from an L-shaped element defining foot and leg portions pivotally mounted for movement of said leg portion into substantially right angled relation with said laterally extending portion, said foot portion being adapted for camming operation by one of said pins moved into contact therewith to move said leg portion into unlocked position, said laterally extending portion being provided with a pin-receiving aperture which is at least partially covered by said foot portion in locking position, and V-shaped contact ridges carried by said foot portion for engagement with the surface surrounding said pin-receiving aperture.

14. In railway cars having adjacent ends adapted for interconnection by coupling members, one of said ends being provided with a laterally extending portion associated with a coupling member which is pivotally movable in a horizontal plane relative to said end, the other of said ends being provided with a cooperating coupling member, the provision of spaced locking fingers carried by said laterally extending portion and being resiliently biased for movement into bridging abutting relation between said laterally extending portion and an element forming a part of said first end to restrain pivotal movement of said first coupling member relative to said first end when said cars are unconnected, and spaced lock-releasing pins carried by the coupling member of said other end for cooperation with said fingers to move the same out of bridging abutting relation when said ends are interconnected, said locking fingers each being formed from an L-shaped element defining foot and leg portions pivotally mounted for movement of said leg portion into rearwardly directed locking relation with said laterally extending portion, said foot portion being adapted for camming operation by one of said pins moved into contact therewith to move said leg portion into unlocked position, said laterally extending portion being provided with a pin-receiving aperture which is at least partially covered by said foot portion in locking position, the free end of said leg portion carrying a rotatable member for engagement with said element forming a part of said first end, said rotatable member having a counterweight associated therewith to normally maintain the same in locking relation, said rotatable member being adapted to jackknife relative to said leg portion against the action of said counterweight when said locking member is moved out of locking position under load.

15. In railway cars having adjacent ends adapted for interconnection by mating coupling members, one of said ends being provided with a male coupling member mounted for pivotal movement in a horizontal plane relative thereto and having a transversely extending face plate associated therewith, the other of said ends being provided with a female coupling member fixed against movement relative thereto, the provision of spaced locking fingers pivotally carried by said face plate and being resiliently biased for movement into bridging abutting relation between said face plate and an element forming a part of said first end to restrain pivotal movement of said male coupling member relative to said first end when said cars are unconnected, and spaced lock-releasing pins carried by said female coupling member of said other end for cooperation with said fingers to move the same out of bridging abutting relation when said ends are interconnected, said fingers functioning in their bridging relation to maintain said male coupling member at least substantially fixed relative to said first end to allow self-centering automatic interconnection between said ends when one is moved toward the other, said pins and fingers being aligned with one another for lock-releasing action following the centering action of said coupling members.

16. In railway cars having adjacent ends adapted for interconnection by coupling members, one of said ends being provided with a coupling member pivotally mounted with respect thereto for horizontal movement and operatively associated with an axle steering mechanism for translating movement of said coupling member relative to the end carrying the same into steering forces applied to a wheel-carrying axle associated with said end, the other of said ends being provided with a cooperating coupling member, the provision of locking fingers pivotally connected with said first coupling member for bridging positioning between the same and an element forming a part of said first end to restrain movement of said first coupling member relative to said first end when said cars are unconnected and thereby maintain said first coupling member and said axle in squared-off relation with said first end, and lock-releasing members carried by said other end associated with said cooperating coupling member to move said fingers out of bridging positioning upon interconnection between said ends.

References Cited in the file of this patent

UNITED STATES PATENTS

| | | |
|---|---|---|
| 2,098,949 | Geissen | Nov. 16, 1937 |
| 2,746,398 | Tomas | May 22, 1956 |
| 2,746,399 | Tomas | May 22, 1956 |
| 2,756,688 | Furrer | July 31, 1956 |